United States Patent
Kim et al.

(10) Patent No.: US 10,834,534 B2
(45) Date of Patent: Nov. 10, 2020

(54) METHOD AND DEVICE FOR PERFORMING LOCATION MEASUREMENT ON BASIS OF PDOA

(71) Applicant: LG Electronics Inc., Seoul (KR)

(72) Inventors: Myeongjin Kim, Seoul (KR); Sangrim Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/627,221

(22) PCT Filed: Jan. 19, 2018

(86) PCT No.: PCT/KR2018/000894
§ 371 (c)(1),
(2) Date: Dec. 27, 2019

(87) PCT Pub. No.: WO2019/004549
PCT Pub. Date: Jan. 3, 2019

(65) Prior Publication Data
US 2020/0128357 A1    Apr. 23, 2020

Related U.S. Application Data

(60) Provisional application No. 62/526,992, filed on Jun. 29, 2017.

(51) Int. Cl.
*H04W 24/00* (2009.01)
*H04W 4/02* (2018.01)
(Continued)

(52) U.S. Cl.
CPC ............. *H04W 4/025* (2013.01); *G01S 5/10* (2013.01); *H04L 5/0051* (2013.01); *H04W 4/40* (2018.02); *H04W 8/24* (2013.01); *H04W 80/08* (2013.01)

(58) Field of Classification Search
None
See application file for complete search history.

(56) References Cited

U.S. PATENT DOCUMENTS

| | | | | |
|---|---|---|---|---|
| 6,181,944 B1 * | 1/2001 | Uebayashi | ............... | G01S 5/14 455/456.2 |
| 6,208,297 B1 * | 3/2001 | Fattouche | ............ | G01S 5/0009 342/450 |

(Continued)

FOREIGN PATENT DOCUMENTS

| | | |
|---|---|---|
| JP | 3370926 | 1/2003 |
| JP | 6106929 | 4/2017 |
| KR | 100398147 | 9/2003 |

OTHER PUBLICATIONS

PCT International Search Report and Written Opinion in International Application No. PCT/KR2018/000894, dated May 29, 2018, 16 pages (with English translation).

(Continued)

*Primary Examiner* — Erika A Washington
(74) *Attorney, Agent, or Firm* — Fish & Richardson P.C.

(57) ABSTRACT

Provided is a method by which a terminal performs location measurement on the basis of a PDOA in a wireless communication system, according to one embodiment of the present description, wherein the method, by which a terminal performs location measurement on the basis of PDOA, comprises: a step for receiving, from a base station, a signal through a plurality of paths; a step for acquiring phase difference information on each of the plurality of paths; and a step for reporting, to the base station, the phase difference information on the basis of the reference signal. The terminal is capable of communicating with at least one of another terminal, a terminal related to an autonomous driving vehicle, the base station, or a network.

12 Claims, 19 Drawing Sheets

(51) Int. Cl.
*H04W 4/40* (2018.01)
*G01S 5/10* (2006.01)
*H04L 5/00* (2006.01)
*H04W 8/24* (2009.01)
*H04W 80/08* (2009.01)

(56) References Cited

U.S. PATENT DOCUMENTS

| | | | |
|---|---|---|---|
| 2006/0239391 A1* | 10/2006 | Flanagan | H04W 56/00 |
| | | | 375/354 |
| 2020/0041604 A1* | 2/2020 | Kim | H04W 64/00 |
| 2020/0053719 A1* | 2/2020 | Sadiq | H04W 72/048 |

OTHER PUBLICATIONS

Tingting Zhang, "Space Time Transceiver Design Over Multipath Fading Channels," Communications and Array Processing, Department of Electrical and Electronic Engineering, Imperial College London, University of London, 147 pages.

* cited by examiner

FIG. 7
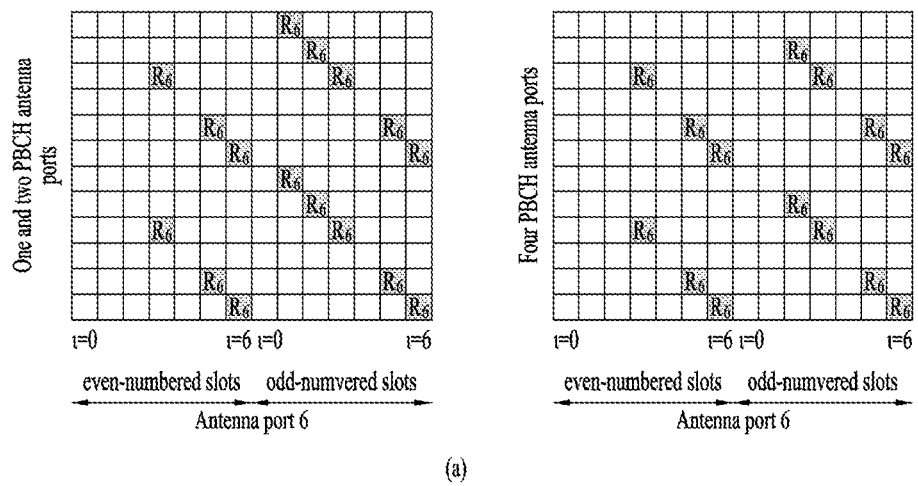
(a)
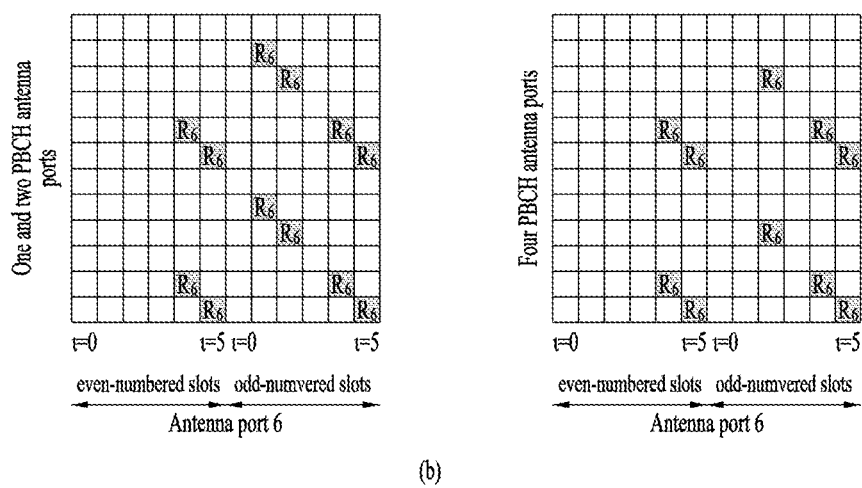
(b)

METHOD AND DEVICE FOR PERFORMING LOCATION MEASUREMENT ON BASIS OF PDOA

TECHNICAL FIELD

The present disclosure relates to a wireless communication system and, more particularly, to a method and apparatus for performing location measurement based on a phase difference of arrival (PDOA).

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms. The 5G technology requires an eNB to have more UE connectivity and it is anticipated that the connectivity required by the 5G is going to be increased up to maximum 1,000,000/km2.

As more communication devices require greater communication capacity, necessity for mobile broadband communication, which is enhanced compared to a legacy radio access technology (RAT), is emerging. Moreover, discussion on a communication system to be designed in consideration of a service/UE sensitive to reliability and latency is in progress. Introduction of a next generation radio access technology (RAT) is being discussed in consideration of the enhanced mobile broadband communication (eMBB), the massive MTC (mMTC), URLLC (ultra-reliable and low latency communication), and the like. In the following, for clarity, the technology is referred to as a New RAT.

DETAILED DESCRIPTION OF THE DISCLOSURE

Technical Problems

An object of the present disclosure is to provide a method of performing location measurement based on PDOA in a wireless communication system.

Another object of the present disclosure is to provide a method of performing location measurement using a plurality of paths.

Another object of the present disclosure is to provide a method of performing location measurement using a plurality of frequencies.

Technical Solutions

According to an aspect of the present disclosure, provided herein is a method of performing location measurement based on phase difference of arrival (PDOA) by a user equipment (UE) in a wireless communication system. The method may include receiving signals through multiple paths from a base station (BS), acquiring phase difference information about each of the multiple paths, and reporting the phase difference information based on reference signals to the BS.

In another aspect of the present disclosure, provided herein is a user equipment (UE) for performing location measurement based on phase difference of arrival (PDOA) in a wireless communication system, including a receiver configured to receive a signal, a transmitter configured to transmit a signal, and a processor configured to control the receiver and the transmitter. The processor may receive signals through multiple paths based on the receiver from a base station (BS), acquire phase difference information about each of the multiple paths, and report the phase difference information based on reference signals to the BS.

The following aspects may be commonly applied to the method and the UE for performing location measurement based on phase difference of arrival (PDOA) in a wireless communication system.

In each aspect of the present disclosure, the UE may report, to the BS, capability information as to whether the UE is capable of distinguishing between signals for the multiple paths and acquiring the phase difference information about each of the multiple paths.

In each aspect of the present disclosure, phase difference information only about signals having strength of a threshold or more among the signals for the multiple paths may be transmitted to the BS.

In each aspect of the present disclosure, based on the number of the reference signals for reporting of the phase difference information, smaller than the number of the signals having strength of the threshold or more, the phase difference information related with the number of the reference signals may be transmitted to the BS in an order of signals having a small phase difference.

In each aspect of the present disclosure, only a signal related with a path having a smallest phase difference among signals for the multiple paths may be transmitted to the BS.

In each aspect of the present disclosure, the UE may transmit only the signal related with the path having the smallest phase difference to the BS, based on reporting of information about a distance between the UE and the BS to the BS.

In each aspect of the present disclosure, the UE may transmit information about all phase differences of the signals for the multiple paths to the BS, based on reporting of information about a location of the UE to the BS.

In each aspect of the present disclosure, whether the UE is to report the information about the distance or the information about the location to the BS may be set based on a higher layer signal.

In each aspect of the present disclosure, the reporting of the phase difference information based on the reference signals to the BS may be set based on a higher layer signal.

Advantageous Effects

The present disclosure may provide a method of performing location measurement based on PDOA in a wireless communication system.

The present disclosure may provide a method of performing location measurement using a plurality of paths.

The present disclosure may provide a method of performing location measurement using a plurality of frequencies.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

FIG. 7 is a diagram illustrating a method of mapping a PRS to a resource element.

BEST MODE FOR CARRYING OUT THE DISCLOSURE

Figure 1:
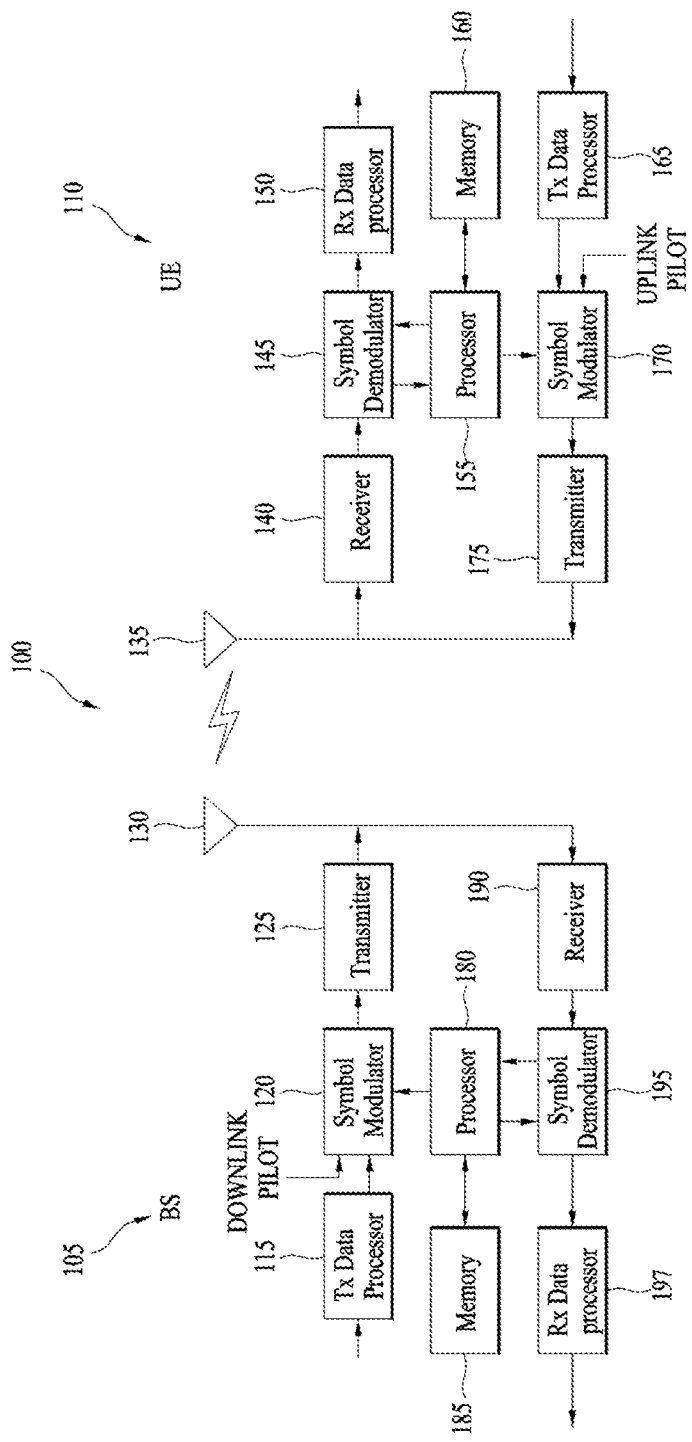
FIG. 1 is a block diagram illustrating the configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes a 3rd Generation Partnership Project (3GPP) Long Term Evolution (LTE) system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on 3GPP LTE system or 3GPP LTE-A system, contents of the present disclosure may be applicable to various kinds of other communication systems.

In a mobile communication system, a UE is able to receive information in Downlink (DL) and is able to transmit information in Uplink (UL) as well. Information transmitted or received by the UE may include various kinds of data and control information. In accordance with types and usages of the information transmitted or received by the UE, various physical channels may exist.

The following descriptions are usable for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like. CDMA can be implemented by such a radio technology as Universal Terrestrial Radio access (UTRA), CDMA 2000 and the like. TDMA can be implemented with such a radio technology as Global System for Mobile communications/General Packet Radio Service/Enhanced Data Rates for GSM Evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of Universal Mobile Telecommunications System (UMTS).

3GPP LTE is a part of Evolved UMTS (E-UMTS) that uses E-UTRA. The 3GPP LTE employs OFDMA in DL and SC-FDMA in UL. And, LTE-A is an evolved version of 3GPP LTE.

Moreover, in the following description, specific terminologies are provided to help the understanding of the present disclosure. And, the use of the specific terminology can be modified into another form within the scope of the technical idea of the present disclosure.

Regarding wireless transmission between a BS and a UE, transmission from the BS to the UE and transmission from the UE to the BS are referred to as DL transmission and UL transmission, respectively. A scheme of distinguishing between radio resources for DL and UL transmission is defined as duplex. When frequency bands are divided into DL transmission bands and UL transmission bands to perform bidirectional transmission and reception, it is referred to as frequency division duplex (FDD). In addition, when time resources are divided into DL transmission resources and UL transmission resources to perform the bidirectional transmission and reception, it is referred to as time division duplex (TDD). When time and frequency resources are shared to perform the bidirectional transmission and reception, it is referred to as full duplex. It is apparent that the method proposed in the present disclosure operates not only in the FDD but also in the TDD or full duplex.

FIG. 1 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 1, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197.

In addition, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present disclosure supports a Multiple Input Multiple Output (MIMO) system. And, the BS 105 according to the present disclosure may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values. The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof.

In the implementation by hardware, the processor 155/180 may be provided with such a device configured to implement the present disclosure as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel. Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
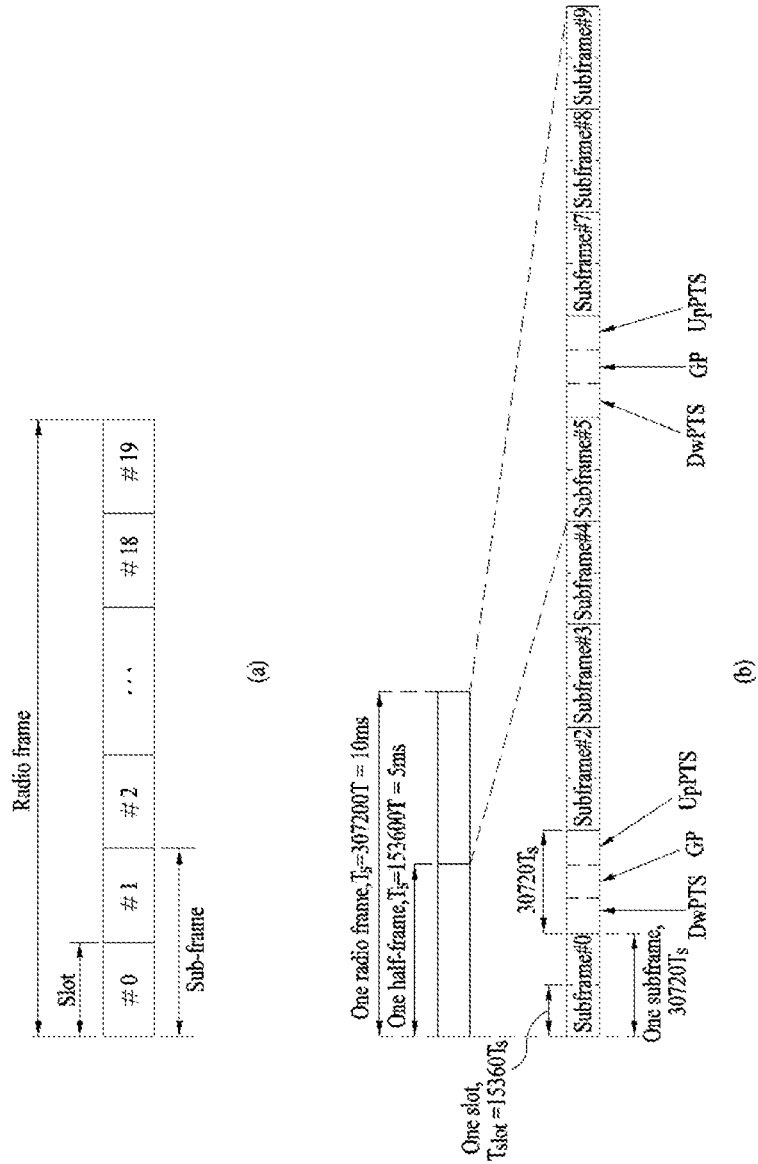
FIG. 2 illustrates the structure of a radio frame used in a wireless communication system.

FIG. 2 is a diagram for an example of a radio frame structure used in a wireless communication system. Specifically, FIG. 2(a) illustrates an exemplary structure of a radio frame which can be used for frequency division multiplexing (FDD) in 3GPP LTE/LTE-A system and FIG. 2(b) illustrates an exemplary structure of a radio frame which can be used for time division multiplexing (TDD) in 3GPP LTE/LTE-A system.

Referring to FIG. 2, a 3GPP LTE/LTE-A radio frame is 10 ms (307,200 Ts) in duration. The radio frame is divided into 10 subframes of equal size. Subframe numbers may be assigned to the 10 subframes within one radio frame, respectively. Here, Ts denotes sampling time where Ts=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time period reserved for DL transmission and UpPTS is a time period reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_S$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Figure 3:
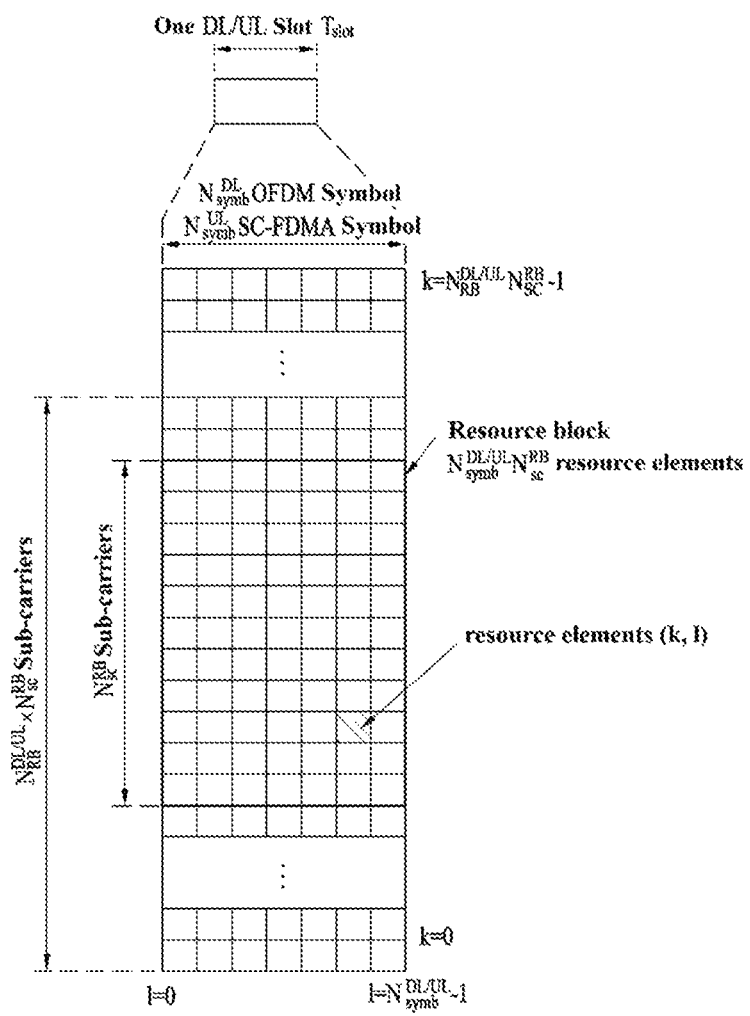
FIG. 3 illustrates the structure of a downlink/uplink (DL/UL) slot in a wireless communication system.

Referring to FIG. 3, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 3, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 3 for convenience of description, embodiments of the present disclosure are similarly applicable to subframes having a different number of OFDM symbols. Referring to FIG. 3, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency f0 in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc}-1$ in the frequency domain, and l is an index ranging from 0 to $N^{DL/UL}_{symb}-1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). A VRB corresponds to a logical resource allocation unit which is introduced to allocate a resource. The VRB has a size identical to a size of a PRB. The VRB is classified into a localized type VRB and a distributed type VRB according to a scheme of mapping the VRB to a PRB. Since VRBs of the localized type are directly mapped to PRBs, a VRB number (or VRB index) directly corresponds to a PRB number. In particular, it becomes nPRB=nVRB. Numbers ranging from 0 to $N^{DL}_{PRB}-1$ are assigned to the VRBs of the localized type and $N^{DL}_{VRB}=N^{DL}_{RB}$. Hence, according to the localized mapping scheme, a VRB having the same VRB number is mapped to a PRB of the same PRB number in a first slot and a second slot. On the contrary, a VRB of the distributed type is mapped to a PRB by passing through interleaving. Hence, a VRB of the distributed type including the same VRB number can be mapped to PRBs of a different number in a first slot and a second slot. Two PRBs each of which is located at each slot of a subframe and having the same VRB number are referred to as a VRB pair.

Figure 4:
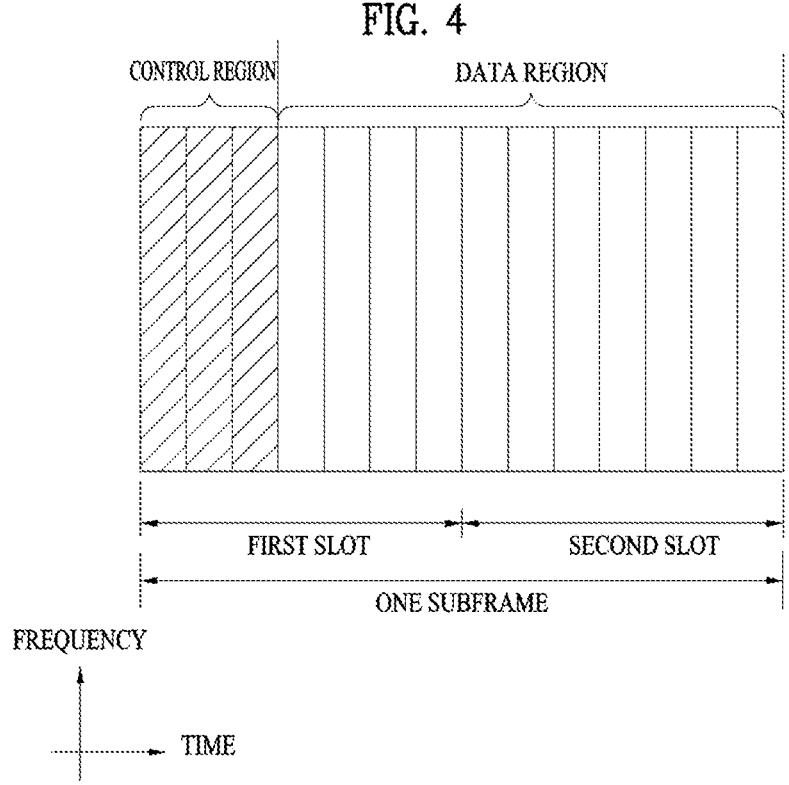
FIG. 4 illustrates the structure of a downlink (DL) subframe used in the 3GPP LTE/LTE-A system.

FIG. 4 illustrates a structure of a DL subframe used in 3GPP LTE/LTE-A system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PCFICH carries a HARQ (Hybrid Automatic Repeat Request) ACK/NACK (acknowledgment/negative-acknowledgment) signal in response to UL transmission.

Control information transmitted on a PDCCH is referred to as downlink control information (DCI). The DCI includes resource allocation information for a UE or UE group and other control information. For example, the DCI includes transmit format and resource allocation information of a downlink shared channel (DL-SCH), transmit format and resource allocation information of an uplink shared channel (UL-SCH), paging information of a paging channel (PCH), system information on a DL-SCH, resource allocation information of a upper layer control message such as a random access response transmitted on PDSCH, a transmit power control command for individual UEs belonging to a UE group, a transmit power control command, activation indication information of VoIP (Voice over IP), a DAI (downlink assignment index), and the like. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

In general, a DCI format capable of being transmitted to a UE varies depending on a transmission mode (TM) set to the UE. In other word, if a UE is configured by a specific transmission mode, it may be able to use a prescribed DCI format(s) corresponding to the specific transmission mode only rather than all DCI formats.

A PDCCH is formed by aggregating one or more consecutive Control Channel Elements (CCEs). A CCE is a logical allocation unit used to provide a PDCCH at a coding rate based on the state of a radio channel. A CCE corresponds to a plurality of resource element groups (REGs). For example, one CCE corresponds to 9 REGs and one REG corresponds to 4 REs. 3GPP LTE defines a CCE set where PDCCH is able to be positioned for each of the user equipments. The CCE set for which a user equipment is able to search its own PDCCH is called a PDCCH search space, simply a search space (SS). An individual resource to which PDCCH is able to be transmitted thereto within the SS is called a PDCCH candidate. A set of PDCCH candidates to be monitored by a UE is defined as a search space. In 3GPP LTE/LTE-A system, a search space for each DCI format may have a different size and a dedicated search space and a common search space are separately defined. The dedicated search space corresponds to a UE-specific search space and may be individually set for each of user equipments. The common search space is configured for a plurality of UEs. Aggregation levels for defining the search space are shown in the following.

TABLE 3

| | Search Space $S_k^{(L)}$ | | |
|---|---|---|---|
| Type | Aggregation Level L | Size[in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to a CCE aggregation level. An eNB transmits actual PDCCH (DCI) in a random PDCCH candidate belonging to a search space and a UE monitors the search space to find out PDCCH (DCI). In this case, the verb 'monitor' means that the UE attempts to decode each of the PDCCH candidates belonging to the search space in accordance with PDCCH formats monitored by the UE. The UE monitors a plurality of PDCCHs and may be able to detect PDCCH of the UE. Basically, since the UE is unable to know a position from which the PDCCH of the UE is transmitted, the UE attempts to decode all PDCCHs of a corresponding DCI format in every subframe until PDCCH including an identifier of the UE is detected. This process is referred to as blind detection (or blind decoding) (BD).

An eNB can transmit data for a UE or a UE group via a data region. The data transmitted via the data region is referred to as a user data. In order to transmit the user data, PDSCH (physical downlink shared channel) can be assigned to the data region. PCH (paging channel) and DL-SCH (downlink-shared channel) are transmitted via the PDSCH. A UE decodes control information transmitted on the PDCCH to read the data transmitted via the PDSCH. Information indicating a UE or a UE group to which the data of the PDSCH is transmitted and information indicating a method for the UE or the UE group to receive and decode the PDSCH data are transmitted in a manner of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific DL subframe. In this case, a UE monitors a PDCCH using its own RNTI information, and if one or more UEs having "A" RNTI are present, the UEs receive the PDCCH and receive the PDSCH indicated by "B" and "C" through the information about the received PDCCH.

In order for a UE to demodulate a signal received from an eNB, it is necessary to have a reference signal (RS) to be compared with a data signal. The reference signal corresponds to a signal of a predetermined specific waveform transmitted to the UE by the eNB or to the eNB by the UE and is referred to as a pilot signal as well. Reference signals are classified into a cell-specific RS commonly used by all UEs in a cell and a demodulation RS (DM RS) dedicated to a specific UE. A DM RS transmitted by an eNB to demodulate downlink data of a specific UE is referred to as a UE-specific RS. In DL, it may transmit a DM RS and a CRS together or transmit either the DM RS or the CRS only. In this case, if the DM RS is transmitted only in DL without the CRS, since the DM RS, which is transmitted by applying the same precoder with data, is used for demodulation purpose only, it is necessary to separately provide an RS for measuring a channel. For example, in 3GPP LTE (-A), an additional RS for measuring a channel, i.e., a CSI-RS, is transmitted to a UE to make the UE measure channel state information. Unlike a CRS transmitted in every subframe, the CSI-RS is transmitted with a prescribed transmission period consisting of a plurality of subframes based on a fact that a channel state is not considerably changed over time.

Figure 5:
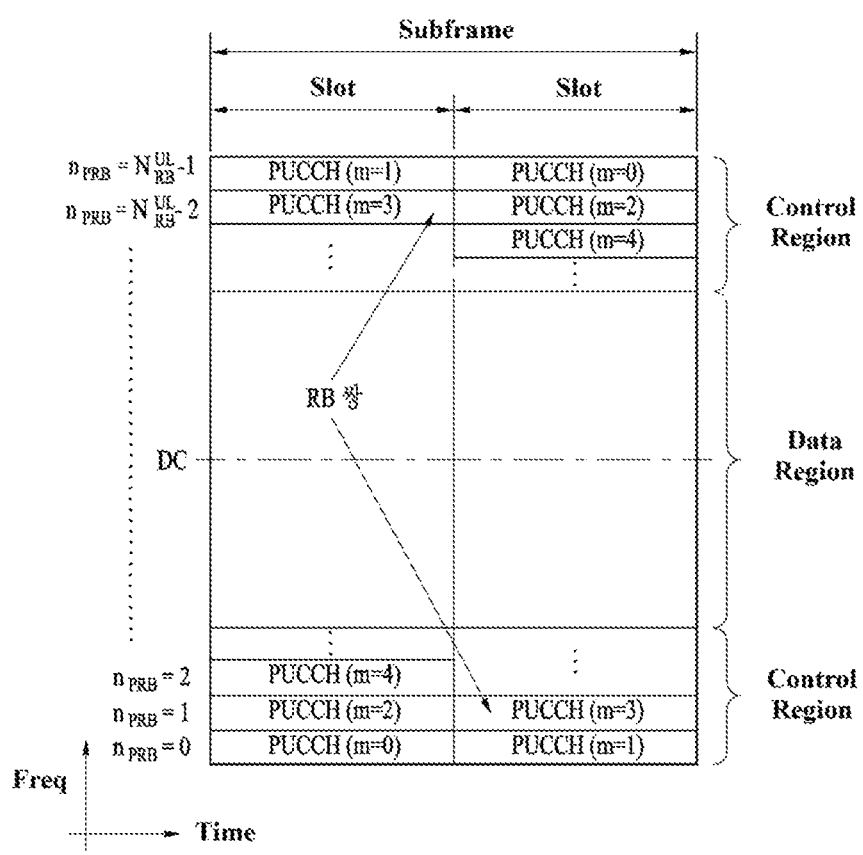
FIG. 5 illustrates the structure of an uplink (UL) subframe used in the 3GPP LTE/LTE-A system.

FIG. 5 is a diagram for an example of an uplink (UL) subframe structure used in 3GPP LTE/LTE-A system.

Referring to FIG. 5, an UL subframe can be divided into a control region and a data region in frequency domain. At least one PUCCH (physical uplink control channel) can be assigned to the control region to transmit uplink control information (hereinafter abbreviated UCI). At least one PUSCH (physical uplink shared channel) can be assigned to the data region to transmit user data.

In an UL subframe, subcarriers far from a DC (direct current) subcarrier are utilized as a control region. In other word, subcarriers positioned at both ends of an UL transmission bandwidth are assigned to transmit UCI. The DC subcarrier is a remaining component not used for transmitting a signal and mapped to a carrier frequency f0 in a frequency up converting process. PUCCH for one UE is assigned to an RB pair in one subframe. RBs belonging to the RB pair occupy a subcarrier different from each other in two slots, respectively. This sort of PUCCH can be represented in a manner that the RB pair allocated to the PUCCH is frequency hopped on a slot boundary. Yet, if a frequency hopping is not applied, the RB pair occupies an identical subcarrier.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for PDCCH and/or a DL data packet (e.g., codeword) on PDSCH. This information indicates whether or not PDCCH or PDSCH is successfully received. HARQ-ACK 1 bit is transmitted in response to a single DL codeword. HARQ-ACK 2 bits are transmitted in response to two DL codewords. HARQ-ACK response includes a positive ACK (simple, ACK), a negative ACK (hereinafter, NACK), DTX (discontinuous transmission), or NACK/DTX. In this case, the term HARQ-ACK is used in a manner of being mixed with HARQ ACK/NACK, ACK/NACK.

CSI (channel state information): Feedback information on a DL channel. MIMO (multiple input multiple output)-related feedback information includes an RI (rank indicator) and a PMI (precoding matrix indicator).

The amount of control information (UCI) capable of being transmitted by a UE in a subframe depends on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, the last SC-FDMA symbol of the subframe is also excluded. A reference signal is used for coherent detection of PUCCH. PUCCH supports various formats depending on transmitted information.

Table 4 in the following shows a mapping relation between a PUCCH format and UCI in LTE/LTE-A system.

TABLE 4

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH format 1 is mainly used for transmitting ACK/NACK and PUCCH format 2 is mainly used for transmitting channel state information (CSI) such as CQI/PMI/RI, and PUCCH format 3 is mainly used for transmitting ACK/NACK information.

In general, in order for a network to obtain location information of a UE, various methods are used in a cellular communication system. As a representative method, a UE receives PRS (positioning reference signal) transmission-related configuration information of a base station from a higher layer signal and measures PRSs transmitted by cells adjacent to the UE to calculate location-related information of the UE using a positioning scheme such as OTDOA (observed time difference of arrival) and forwards the calculated information to the network. Besides, an assisted global navigation satellite system (A-GNSS) positioning scheme, enhanced cell-ID (E-CID) techniques, uplink time difference of arrival (UTDOA), and the like exist. The abovementioned positioning schemes can be utilized for various location-based services (e.g., advertising, location tracking, emergency communication means, etc.).

[LTE Positioning Protocol]

In LTE system, LPP (LTE positioning protocol) is defined to support the OTDOA scheme. According to the LPP, OTDOA-ProvideAssistanceData having a configuration described in the following is transmitted to a UE as an IE (information element).

TABLE 5

```
-- ASN1START
OTDOA-ProvideAssistanceData ::= SEQUENCE {
    otdoa-ReferenceCellInfo     OTDOA-ReferenceCellInfo
        OPTIONAL,     -- Need ON
    otdoa-NeighbourCellInfo     OTDOA-NeighbourCellInfoList
        OPTIONAL.     -- Need ON
otdoa-Error
            OTDOA-Error
        OPTIONAL,
-- Need ON
    ...
    }
-- ASN1STOP
```

In this case, OTDOA-ReferenceCellInfo corresponds to a reference cell for measuring RSTD and can be configured as follows.

TABLE 6

```
-- ASN1START
OTDOA-ReferenceCellInfo ::= SEQUENCE {
    physCellId                  INTEGER (0..503),
    cellGlobalId                ECGI
OPTIONAL,            -- Need ON
    earfcnRef                   ARFCN-ValueEUTRA
OPTIONAL,            -- Cond NotSameAsServ0
    antennaPortConfig           ENUMERATE {ports1-or-2,
ports4, ... }
        OPTIONAL,   -- Cond NotSameAsServ1
        cpLength                ENUMERATED { normal,
extended, ... }.
        prsInfo                 PRS-Info
OPTIONAL,            -- Cond PRS...,
    [[ earfcnRef-v9a0           ARFCN-ValueEUTRA-v9a0
    OPTIONAL            -- Cond NotSameAsServ2]]
    }
-- ASN1STOP
```

In this case, conditional presences are shown in the following.

TABLE 7

| Conditional presence | description |
| --- | --- |
| NotSameAsServ0 | This field is absent if earfcnRef-v9a0 is present. Otherwise, the field is mandatory present if the EARFCN of the OTDOA assistance data reference cell is not the same as the EARFCN of the target devices's current primary cell. |
| NotSameAsServ1 | The field is mandatory present if the antenna port configuration of the OTDOA assistance data reference cell is not the same as the antenna port configuration of the target devices's current primary cell. |
| NotSameAsServ2 | The field is absent if earfenRef is present. Otherwise, the field is mandatory present if the EARFCN of the OTDOA assistance data reference cell is not the same as the EARFCN of the target devices's current primary cell. |
| PRS | The field is mandatory present if positioning reference signals are available in the assistance data reference cell; otherwise it is not present. |

Each individual field of the OTDOA-ReferenceCellInfo is described in the following.

TABLE 8

OTDOA-ReferenceCellInfo field description
physCellId
This field specifies the physical cell identity of the assistance data reference cell.
cellGlobalId
This field specifies the ECGI, the globally unique identity of a cell in E-UTRA, of the assistance data reference cell. The server should include this field if it considers that it is needed to resolve ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference signals (CRS) are used in the assistance data reference ell.
cpLength
This field specifies the cyclic prefix length of the assistance data reference cell PRS if the prsInfo field is present, otherwise this field specifies the cyclic prefix length of the assistance data reference cell CRS.
prsInfo
This field specifies the PRS configuration of the assistance data reference cell.

Meanwhile, OTDOA-NeighbourCellInfo corresponds to cells (e.g., an eNB or a TP) becoming a target of RSTD measurement and can include information on maximum 24 neighbor cells according to each frequency layer for maximum 3 frequency layers. In particular, it may be able to inform a UE of information on 72 (3*24) cells in total.

TABLE 9

```
-- ASN1START
    OTDOA-NeighbourCellInfoList ::= SEQUENCE (SIZE (1..maxFreqLayers)) OF
OTDOA-NeighbourFreqInfo
    OTDOA-NeighbourFreqInfo ::= SEQUENCE (SIZE (1..24)) OF OTDOA-
NeighbourCellInfoElement
    OTDOA- NeighbourCellInfoElement ::= SEQUENCE {
    physCellId                          INTEGER
        (0..503)
            cellGlobalId            ECGI
        OPTIONAL,           -- Need ON
            earfcn                      ARFCN-
    alucEUTRA                OPTIONAL,  -- Cond NotSameAsRef0
            cpLength                    ENUMERATED
{normal, extended, ...}
        OPTIONAL,           -- Cond NotSameAsRef1
        prsInfo                     PRS-Info
        OPTIONAL,           -- Cond NotSameAsRef2
        antennaPortConfig               ENUMERATED {ports-
1-or-2, ports-4, ...}
        OPTIONAL,           -- Cond NotSameAsRef3
        slotNumberOffset            INTEGER (0..19)
            OPTIONAL,       -- Cond NotSameAsRef4
        prs-SubframeOffset              INTEGER (8..1279)
            OPTIONAL        -- Cond InterFreq
        expectedRSTD                INTEGER (8..16383),
        expectedRSTD-Uncertainty    INTEGER (0..1023)
    ..
[[ earfcn-v9a0                   ARFCN-ValueEUTRA-v9a0
        OPTIONAL        -- Cond NotSameAsRef5]]
    ]
        maxFreqLayers   INTEGER ::= 3
-- ASN1STOP
```

In this case, conditional presences are shown in the following.

TABLE 10

| Conditional presence | Description |
| --- | --- |
| NotSameAsRef0 | The field is absent if earfcn-v9a0 is present. If earfcn-v9a0 is not present, the field is mandatory present if the EARFCN is |

TABLE 10-continued

| Conditional presence | Description |
|---|---|
| | not the same as for the assistance data reference cell; otherwise it is not present. |
| NotSameAsRef1 | The field is mandatory present if the cyclic prefix length is not the same as for the assistance data reference cell; otherwise it is not present. |
| NotSameAsRef2 | The field is mandatory present if the PRS configuration is not the same as for the assistance data reference cell; otherwise it is not present. |
| NotSameAsRef3 | The field is mandatory present if the antenna port configuration is not the same as for the assistance data reference cell; otherwise it is not present. |
| NotSameAsRef4 | The field is mandatory present if the slot timing is not the same as for the assistance data reference cell; otherwise it is not present. |
| NotSameAsRef5 | The field is absent if earfcn is present. If earfcn is not present, the field is mandatory present if the EARFCN is not the same as for the assistance data reference cell; otherwise it is not present. |
| InterFreq | The field is optionally present, need OP, if the EARFCN is not the same as for the assistance data reference cell; otherwise it is not present. |

Each individual field of the OTDOA-NeighbourCellInfo-List is described in the following.

TABLE 11

OTDOA-NeighbourCellInfoList field description physCellId
This field specifies the physical cell identity of the assistance data reference cell.

cellGlobalId
This field specifies the ECGI, the globally unique identity of a cell in E-UTRA, of the assistance data reference cell. The server should include this field if it considers that it is needed to resolve ambiguity in the cell indicated by physCellId.

earfcnRef
This field specifies the EARFCN of the assistance data reference cell.

antennaPortConfig
This field specifies whether 1 (or 2) antenna port(s) or 4 antenna ports for cell specific reference signals (CRS) are used in the assistance data reference cell.

cpLength
This field specifies the cyclic prefix length of the neigbour cell PRS if PRS are present in this neighbour cell, otherwise this field specifies the cyclic prefix length of CRS in this neighbour cell.

prsInfo
This field specifies the PRS configuration of the neighbour cell.
When the EARFCN of the neighbour cell is the same as for the assistance data reference cell, the target device may assume that each PRS positioning occasion in the neighbour cell at least partially overlaps with a PRS positioning occasion in the assistance data reference cell where the maximum offset between the transmitted PRS positioning occasions may be assumed to not exceed half a subframe.
When the EARFCN of the neighbour cell is the same as for the assistance data reference cell, the target device may assume that this cell has the same PRS periodicity (Tprs) as the assistance data reference cell.

In this case, PRS-Info corresponding to an IE, which is included in the OTDOA-ReferenceCellInfo and the OTDOA-NeighbourCellInfo, includes PRS information. Specifically, the PRS-Info is configured as follows while including PRS Bandwidth, PRS Configuration Index (IPRS), Number of Consecutive Downlink Subframes, and PRS Muting Information.

TABLE 12

```
PRS-Info ::= SEQUENCE {
    prs-Bandwidth        ENUMERATED { n6, n15, n25, n50, n75,
n100, ...},
    prs-ConfigurationIndex  INTEGER (0..4095),
    numDL-Frames            ENUMERATED {sf-1, sf-2, sf-4, sf-6, ...),
    ...,
    prs-MutingInfo-r9    CHOICE {
        po2-r9                          BIT STRING (SIZE(2)),
        po4-r9                          BIT STRING (SIZE(4)),
        po8-r9                          BIT STRING (SIZE(8)),
        po16-r9                         BIT STRING
(SIZE(16)),
        ...
    }
    OPTIONAL                -- Need OP
}
-- ASN1STOP
```

Figure 6:
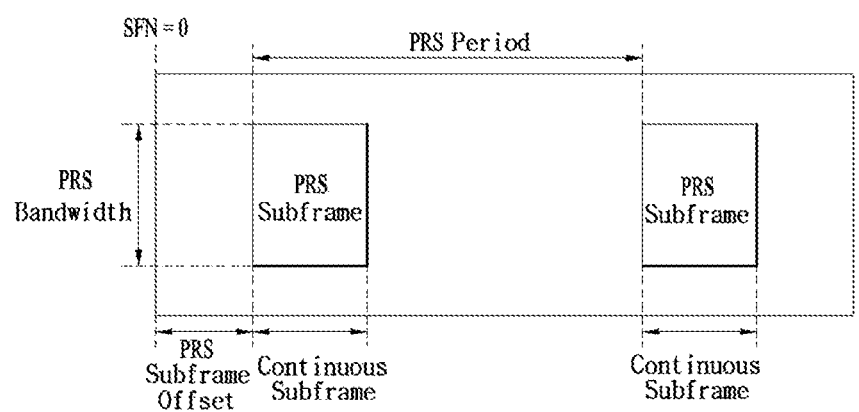
FIG. 6 illustrates a structure for transmitting a positioning reference signal (PRS).

FIG. 6 is a diagram for a PRS transmission structure according to the parameters.

In this case, PRS periodicity and PRS subframe offset are determined according to a value of PRS configuration index (IPRS) and a corresponding relation is shown in the following table.

TABLE 13

| PRS Configuration Index ($I_{PRS}$) | PRS Periodicity (subframes) | PRS Subframe Offset (subframes) |
| --- | --- | --- |
| 0-159 | 160 | $I_{PRS}$ |
| 160-479 | 320 | $I_{PRS}$ − 160 |
| 480-1119 | 640 | $I_{PRS}$ − 180 |
| 1120-23399 | 1280 | $I_{PRS}$ − 1120 |

[PRS (Positioning Reference Signal)]

A PRS has a transmission occasion, that is, a positioning occasion at intervals of 160, 320, 640, or 1280 ms. The PRS may be transmitted in N consecutive DL subframes at the positioning occasion, where N may be 1, 2, 4, or 6. Although the PRS may be substantially transmitted at the positioning occasion, it may be muted for inter-cell interference control cooperation. Information on PRS muting is signaled to a UE through prs-MutingInfo. Unlike a system bandwidth of a serving BS, a PRB transmission bandwidth may be independently configured and the PRS is transmitted in a frequency bandwidth of 6, 15, 25, 50, 75, or 100 resource blocks (RBs). A transmission sequence for the PRS is generated by initializing a pseudo-random sequence generator for every OFDM symbol using a function of a slot index, an OFDM symbol index, a cyclic prefix (CP) type, and a cell ID. The generated transmission sequences for the PRS can be differently mapped to resource elements (REs) based on whether a normal CP or extended CP is used. A position of the mapped RE may be shifted on the frequency axis, and in this case, a shift value is determined by a cell ID.

For PRS measurement, a UE receives configuration information on a list of PRSs that the UE should search for from a positioning server of the network. The corresponding information includes PRS configuration information of a reference cell and PRS configuration information of neighboring cells. Configuration information for each PRS includes a generation period of the positioning occasion and offset thereof, the number of consecutive DL subframes included in one positioning occasion, a cell ID used in generating a PRS sequence, a CP type, the number of CRS antenna ports considered in PRS mapping, etc. In addition, the PRS configuration information of neighboring cells includes slot offsets and subframe offsets of the neighbor cells and reference cell, expected RSTD, and a degree of uncertainty of the expected RSTD. Thus, the PRS configuration information of neighboring cells supports the UE to determine when and which time window the UE should search for corresponding PRSs to detect PRSs transmitted from the neighboring cells.

For example, FIG. 7 is a diagram illustrating mapping of a PRS to resource elements. A transmission sequence for the PRS is generated by initializing a pseudo-random sequence generator for every OFDM symbol using a function of a slot index, an OFDM symbol index, a cyclic prefix (CP) type, and a physical cell ID. When a normal CP is used, the generated sequences can be mapped as shown in FIG. 7(a). When an extended CP is sued, the generated sequences can be mapped as shown in FIG. 7(b). A position of the mapped RE may be shifted on the frequency axis, and a shift value is determined by the physical cell ID. In this case, for example, the positions of REs for PRS transmission shown in FIGS. 7(a) and (b) may be calculated on the assumption that the frequency shift is 0.

Meanwhile, the aforementioned RSTD may mean a relative timing difference between adjacent or neighboring cell j and reference cell i. That is, the RSTD can be expressed as TsubframeRxj−TsubframeRxi, where TsubframeRxj indicates a time when the UE receives the start of a specific subframe from the adjacent cell j, and TsubframeRxi indicates a time when the UE receives the start of a subframe corresponding to the specific subframe from the reference cell i, which is closest in time to the specific subframe received from the adjacent cell j. The reference point for the observed subframe time difference could be an antenna connector of the UE.

As described above, the network can obtain position information of the UE in the wireless communication system using various methods.

As another example, the UE's position can be measured using phase information in the wireless communication system. For instance, a distance may be primarily influenced by hardware components but less influenced by phase differences. In a single antenna system, Equation 1 below may be used to calculate a distance. In Equation 1, d is a distance, λ is a wavelength, Ø is a phase difference between transmitted and received signals, and n is a positive integer.

$$d = \frac{\lambda}{2}\left(\frac{\emptyset}{2\pi} + n\right) \quad \text{[Equation 1]}$$

In Equation 1, the distance d may be determined according to λ/2 irrespective of the phase change, Ø. In detail, Ø can be determined according to an internal phase $\emptyset_{int}$ and a propagation phase $\emptyset_{prop}$ as shown in Equation 2 below. However, in Equation 2, $\emptyset_{int}$ is an initial value and cannot be calculated. Thus, the distance d can be measured based on X/2 regardless of the phase change in Equation 1.

$$\emptyset = \emptyset_{int} + \emptyset_{prop} \quad \text{[Equation 2]}$$

However, for example, when two different frequencies are used, the above-described $\emptyset_{int}$ factor can be eliminated in the calculation. Specifically, if the different frequencies have the same $\emptyset_{int}$ value, it can be eliminated in the calculation, and thus position measurement can be performed using phase information. In this case, a phase difference of arrival (PDOA) scheme may be used to measure a distance using different frequencies. According to the PDOA scheme, a position is measured using a phase difference at difference frequencies with respect to a received signal.

In detail, when the position measurement is performed based on the PDOA scheme, two basic frequencies may be used. For example, a RFID reader can transmit two continuous wave signals at frequencies f1 and f2. In this case, a phase at frequency i can be expressed as shown in Equation 3 below irrespective of modulation and noise of the RFID. In this case, i may have a value of 1 or 2, and c indicates the propagation velocity or the speed of light, i.e., c=3×108.

$$\emptyset_i = 4\pi f_i d/c \quad \text{[Equation 3]}$$

The value of d can be calculated according to Equation 3. That is, the phase difference is present as many as the frequency difference, and this can be expressed as shown in Equation 4. In this case, the conditions of $0 \leq \emptyset_i < 2\pi$ and $0 \leq \Delta\emptyset = \emptyset_2 - \emptyset_1 < 2\pi$ can be satisfied.

$$\hat{d} = \frac{c\Delta\emptyset}{4\pi(f_2 - f_1)} + \frac{cm}{2(f_2 - f_1)} \quad \text{[Equation 4]}$$

For example, in Equation 4, the second term may denote range ambiguity due to phase wrapping. The maximum value of an ambiguous distance may be expressed as $d_{max} = c/2|f_2 - f_1|$. In other words, as the frequency difference is decreased, the maximum value of the ambiguous distance may be increased. However, when the frequency difference is decreased, the performance may be significantly degraded due to noise. In addition, considering that a prescribed range of frequencies are used in the wireless communication system, the problem of how the frequencies are apart should be solved. That is, the frequency range used in the system and the above-mentioned error are in the trade-off relationship, and thus a frequency to be used for the PDOA scheme can be selected in consideration of the frequency range and error. Moreover, when two frequencies are used, an error may be caused by the fade phenomenon for one of the two frequencies. Thus, the position measurement can also be performed using at least two frequencies, and details will be described later.

Figure 8:
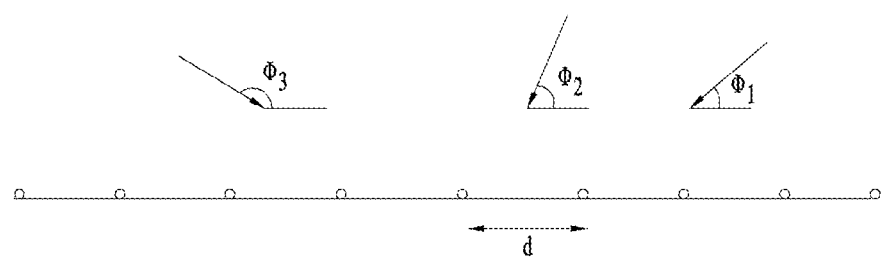
FIG. 8 is a diagram illustrating a method of estimating a direction of arrival (DOA).

As a further example, a direction of arrival (DOA) scheme may be considered. Referring to FIG. 8, each of a plurality of signals (M signals) may have its own directions $\emptyset_i$. According to the DOA scheme, the directions of received signals may be estimated. That is, the direction of a received signal may be estimated and determined from the received signal using the DOA scheme.

A method of estimating a distance between wireless communication devices in a multipath environment will be described hereinbelow. In this case, as an example, the devices, which are targets for location measurement, may measure the distance using phase information of radio signals transmitted thereby. Although, in the following description, an example of transmitting and receiving signals using two frequencies will be given, the principle of the present disclosure is applicable even to the case in which the number of frequencies used for transmission and reception is generalized. In addition, although the following description assumes a situation in which multiple frequencies are simultaneously transmitted, the frequencies may be transmitted at different predetermined timings and the principle of the present disclosure may be applied in consideration of such a situation without being limited to the above-described embodiment.

Figure 9:
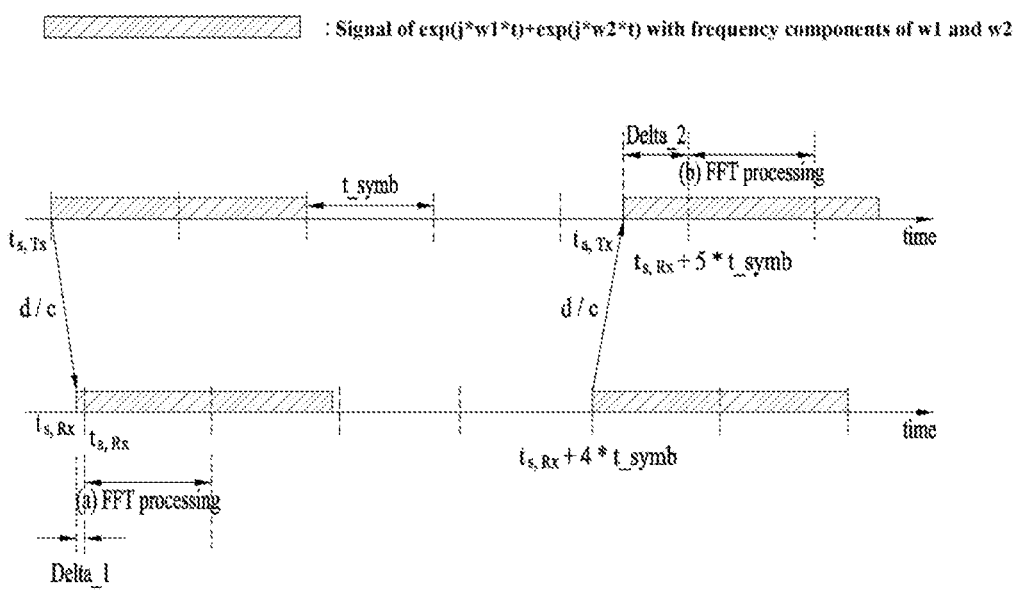
FIG. 9 is a diagram illustrating a distance measurement method using a phase difference.

Referring to FIG. 9, timings at which a transmitter and a receiver perform operations for transmitting and receiving signals may be quantized. For example, when the transmitter and the receiver transmit and receive signals based on OFDM, boundary points of respective OFDM symbols of the signals may be quantized timings at which the transmission and reception operations are performed. When starting timings of the transmission and reception operations of the transmitter and the receiver are ts,Tx and ts,Rx, respectively, it is assumed that the quantized timings repeatedly appear at every tsymb. In OFDM, tsymb may be the length of an OFDM symbol and this may be as illustrated in FIG. 9.

Referring to FIG. 9, a phase difference may be used for distance measurement at the transmitter and the receiver. First, the receiver may be synchronized with a synchronization signal transmitted by the transmitter. In this case, although a transmission signal repeated on two symbols is considered, a transmission signal having a cyclic prefix (CP) and data on one symbol length may also be considered.

As an example, the transmitter may transmit a sinusoidal wave, which is a PRS, with angular frequencies w1 and w2 at a timing ts,Tx. Next, the signal may be delayed by d/c based on the distance d between the transmitter and receiver and the speed c of light and then may reach at the receiver at a timing ta,Rx. In this case, a baseband signal caused by sampling (or quantization) may acquire sampling values starting from the timing ts,Rx. Assuming that the size of fast Fourier transform (FFT) is N, values corresponding to w1 and w2 may be obtained by inputting a total of N sampling values to FFT. In this case, a phase difference between the two values may be as indicated by Equation 5 below.

$$B = \arg\left(\frac{X_{RX}(w_2)}{X_{RX}(w_1)}\right) = (w_2 - w_1)(t_{s,RX} - t_{a,RX}) \quad \text{[Equation 5]}$$

That is, since w2−w1 is a known value, ts,Rx−ta,Rx (=delta_1) may be obtained from the above equation. This value indicates the difference between a timing at which the receiver starts OFDM processing and a timing at which a signal actually reaches at the receiver.

In the same way, the receiver transmits a sinusoidal wave having angular frequencies w1 and w2 after n symbols like the transmitter. Next, the transmitter may obtain a value ts,Tx+(n+1)*t_symb−ta,Tx (=delta_2) by performing FFT using N sampling values starting from ts,Tx+(n+1)*t_symb. In FIG. 9 described above, the case in which n=4 is illustrated.

Accordingly, the transmitter may calculate a total round trip time as t_symb−delta_2−delta_1 (=2*d/c). In this case, although the transmitter may be aware of the values delta_2 and t_symb, the transmitter may not be aware of the value delta_1. Therefore, for final distance measurement, if the receiver transmits the value delta_1 (phase difference information B) measured thereby to the transmitter, the transmitter may measure the distance to the receiver.

The case in which only line-of-sight (LOS) is present between the transmitter and the receiver may be considered. In addition, there may be the case in which non-line-of-sight (NLOS) is present, but received power is too low so that NLOS is negligible. That is, the case in which there is no obstacle in signal transmission between the transmitter and the receiver may be considered. As an example, the distance obtained using Equation 1 above may indicate a lineal distance d, which is the shortest distance between the transmitter and the receiver.

However, in an environment in which multiple paths are present, the value obtained using Equation 1 may not be the shortest distance d between the transmitter and the receiver. That is, in an environment in which multiple paths are present, a value for any one path in which an LOS path and an NLOS path are mixed may be calculated. Therefore, in an environment in which multiple paths are present, an error may greatly occur in the distance between the transmitter and the receiver, obtained using Equation 1. Therefore, in an environment in which multiple paths are present, there is a great error in the distance between the transmitter and the receiver, obtained using Equation 1.

In an example, a receiver having multiple antennas may distinguish between signals received through multiple paths using spatial filtering or an antenna array. In this case, the length of a path may be obtained through a phase difference between angular frequencies w1 and w2 of a signal received through each path.

In other words, when the lengths of multiple paths are obtained but it is not aware of which path is an LOS path or a path near the LOS path, a location server may perform location estimation through length information about multiple paths rather than length information about one path in order to reduce an error in location tracking using multilateration, which will be described later.

Figure 10:
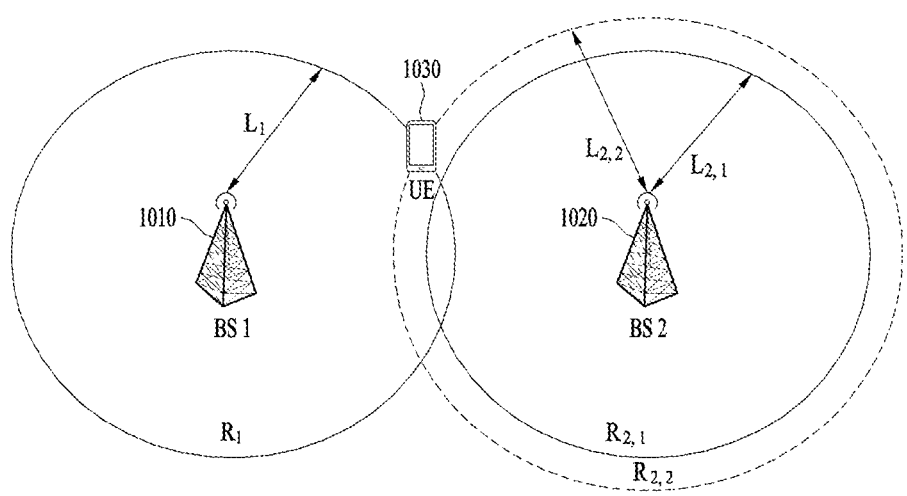
FIG. 10 is a diagram illustrating a method of performing location measurement using distance information about multiple paths.

More specifically, FIG. 10 illustrates a method of reducing an error of location tracking using distance information about multiple paths. For example, each of transmitters 1010 and 1020 may inform a location server of only the length of one path among a plurality of paths. In this case, the respective transmitters and 1010 and 1020 may transmit only information about circles R1 and R2,1 indicated by distances L1 and L2,1 between the transmitters and a receiver to the location server. Referring to FIG. 10, however, the receiver (or UE 1030) may be present in a place at which circles R1 and R2,2 meet. Accordingly, in order to reduce an error of location tracking, the location server may reduce an error of location tracking caused by interference using phase difference information about multiple paths rather than using phase difference information only about one path. Therefore, a method of obtaining the distance between a transmitter and a receiver and the location of the receiver, using information about a phase difference between frequencies generated by each path, will be described below.

As an example, a phase difference of a signal for each path may be obtained by distinguishing between signals received from multiple paths using spatial filtering or an antenna array.

Figure 11:
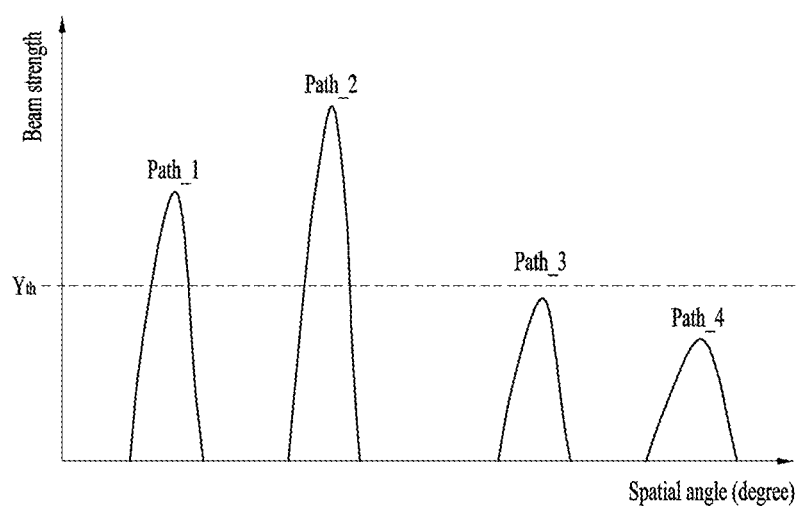
FIG. 11 is a diagram illustrating signal strength for multiple paths.

As an example, referring to FIG. 11, the case in which 4 paths obtained using an antenna array is present is illustrated. In this case, a receiver may obtain a phase difference between angular frequencies w1 and w2 of a signal received through each path. That is, when the phase difference between the angular frequencies w1 and w2 of a signal input to the receiver through a p-th path among a total of P paths is Bp, the receiver may inform, through an RS, the transmitter of information about the phase difference Bp corresponding to each path.

Figure 12:
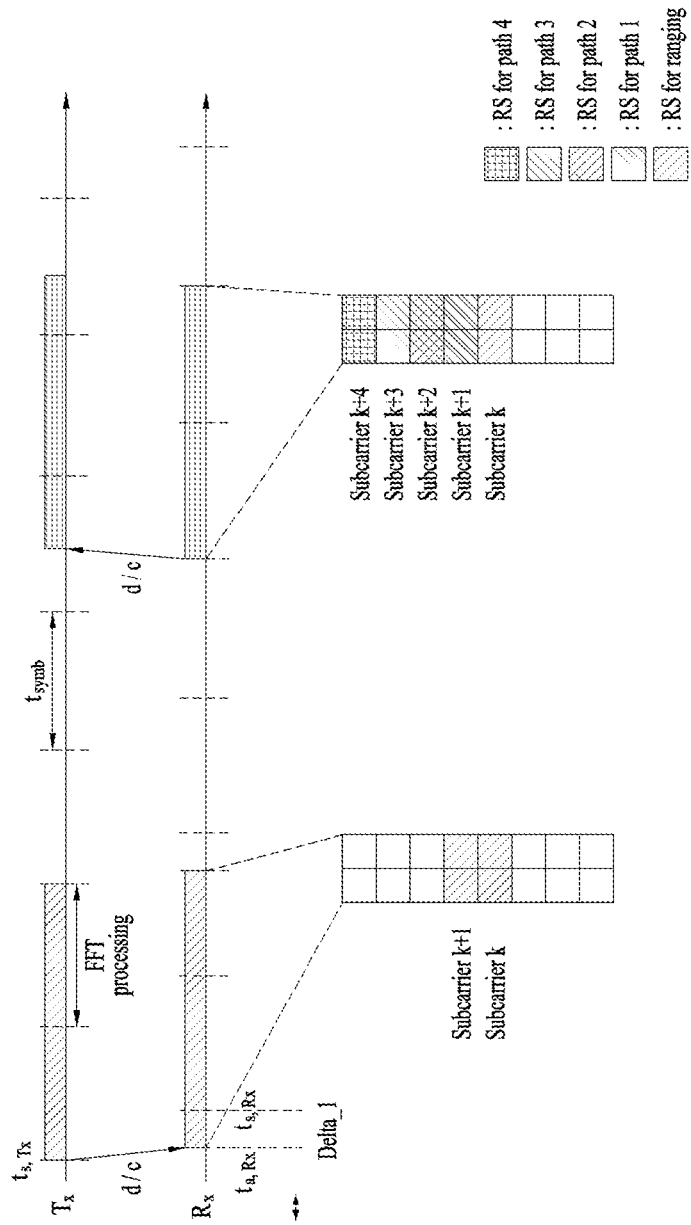
FIG. 12 is a diagram illustrating a method of transmitting RSs based on multiple paths.

As an example, referring to FIG. 12, RSs may be additionally transmitted in order to transmit phase information corresponding to the 4 paths in FIG. 11 described above to the transmitter. In this case, an RS transmitted on a subcarrier k+p may have a phase difference of Bp with an RS transmitted on a subcarrier k.

Figure 13:
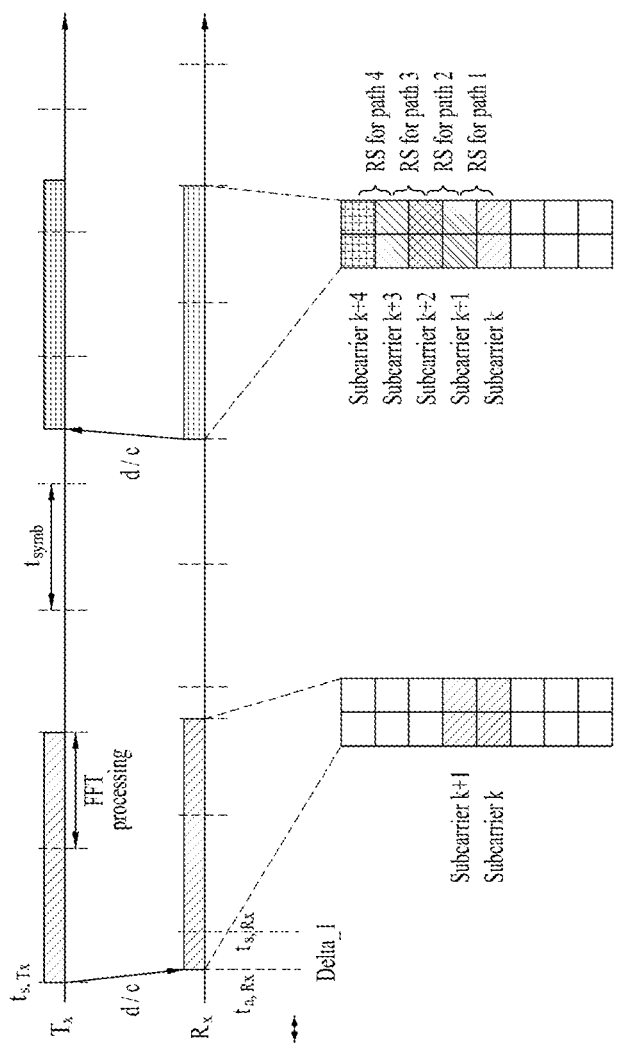
FIG. 13 is a diagram illustrating a method of transmitting RSs based on multiple paths.

As another example, referring to FIG. 13, phase difference information may be transmitted to the transmitter such that a phase difference of each subcarrier may be equal to a phase difference of each path. In this case, the receiver may set a phase difference between a subcarrier k+p−1 and a subcarrier k+p to be a phase difference Bp of a p-th path. Then, although distance resolution is reduced, robust of performance against noise may be raised.

In this case, a UE may report, to a location server, a signal indicating information as to whether the UE has a capability of performing measurement of a phase difference of a signal corresponding to each path by distinguishing between signals received from a plurality of paths using spatial filtering or an antenna array.

In this case, the receiver may receive information about the number of RSs capable of transmitting phase information of a path and information about the location of the RSs from the transmitter. When the number of RSs transmitted by the receiver to the transmitter is limited, the receiver may not transmit phase difference information about all paths to the transmitter and may transmit only phase difference information about paths satisfying a specific condition.

As an example, the receiver may inform, through an RS, the transmitter of only phase difference information about a signal received through a path corresponding to the case in which the strength of a signal (e.g., signal-to-noise ratio (SNR)) is a specific threshold yth or more among signals received through a plurality of paths.

Figure 14:
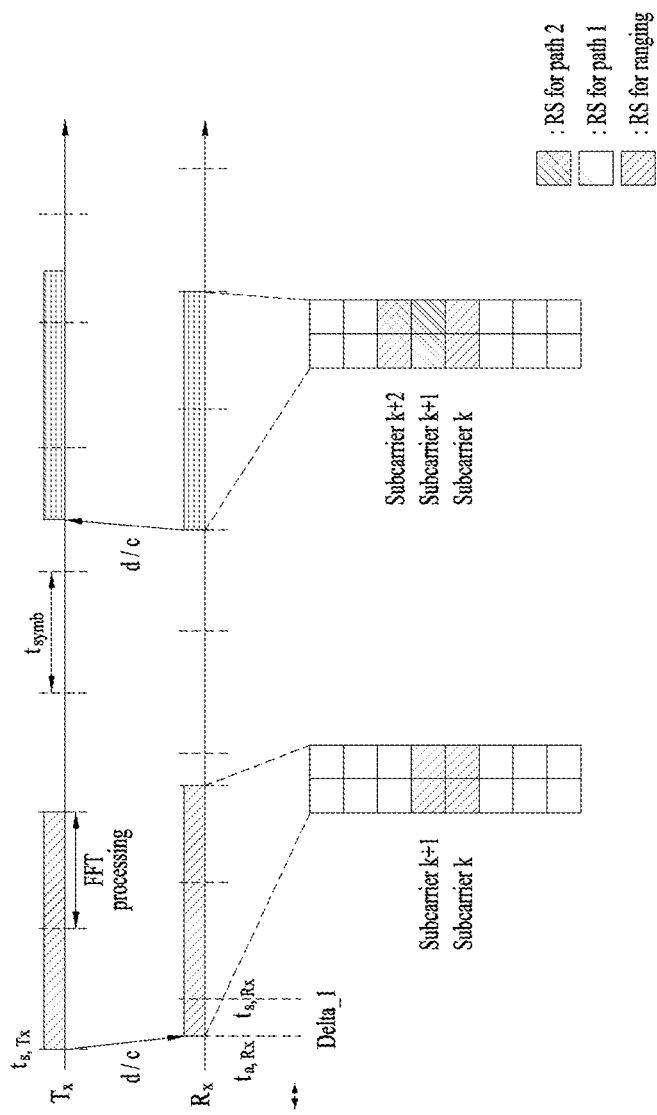
FIG. 14 is a diagram illustrating a method of transmitting RSs based on multiple paths.

For example, upon acquiring multipath profiles as illustrated in FIG. 11, the receiver may inform the transmitter of phase difference information through the RS as illustrated in FIG. 14.

Figure 15:
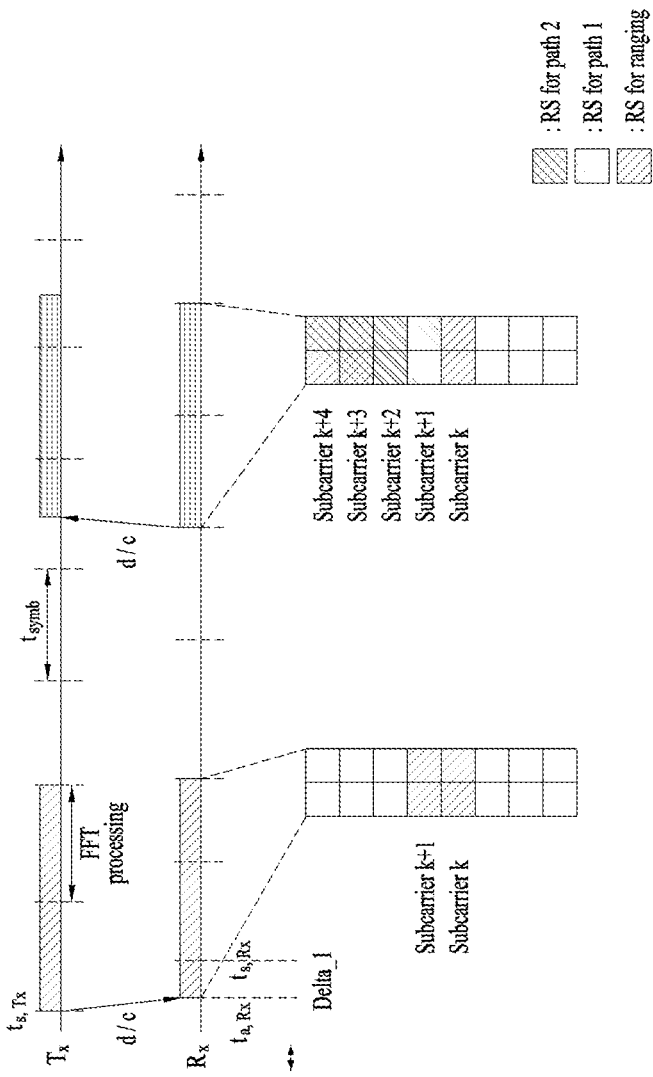
FIG. 15 is a diagram illustrating a method of transmitting RSs based on multiple paths.
Figure 16:
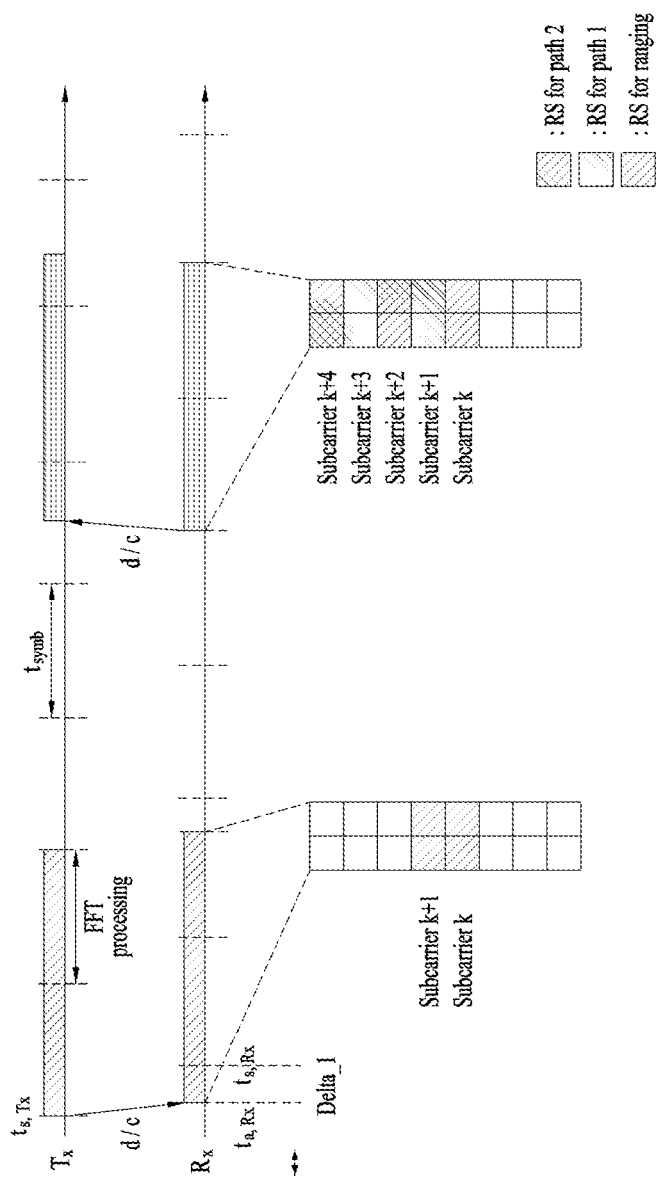
FIG. 16 is a diagram illustrating a method of transmitting RSs based on multiple paths.

In addition, for example, referring to FIG. 15, when the number of RSs through which phase difference information is reported to the transmitter is smaller than the number of paths corresponding to the strength of signals (e.g., SNR) exceeding a specific threshold, the transmitter may inform the receiver only phase difference information about a path representing a short distance (i.e., values having a small phase difference). Herein, when the number of RSs through which phase difference information is reported to the transmitter is larger than the number of paths corresponding to the strength of signals (e.g., SNR) exceeding the specific threshold, the transmitter may inform the receiver of phase difference information through a plurality of RSs as illustrated in FIG. 15. As an example, phase difference information about respective paths may be transmitted in consecutive RSs as in FIG. 15. As another example, based on FIG. 16, the phase difference information about respective paths may be transmitted in non-consecutive RSs to the receiver.

Figure 17:
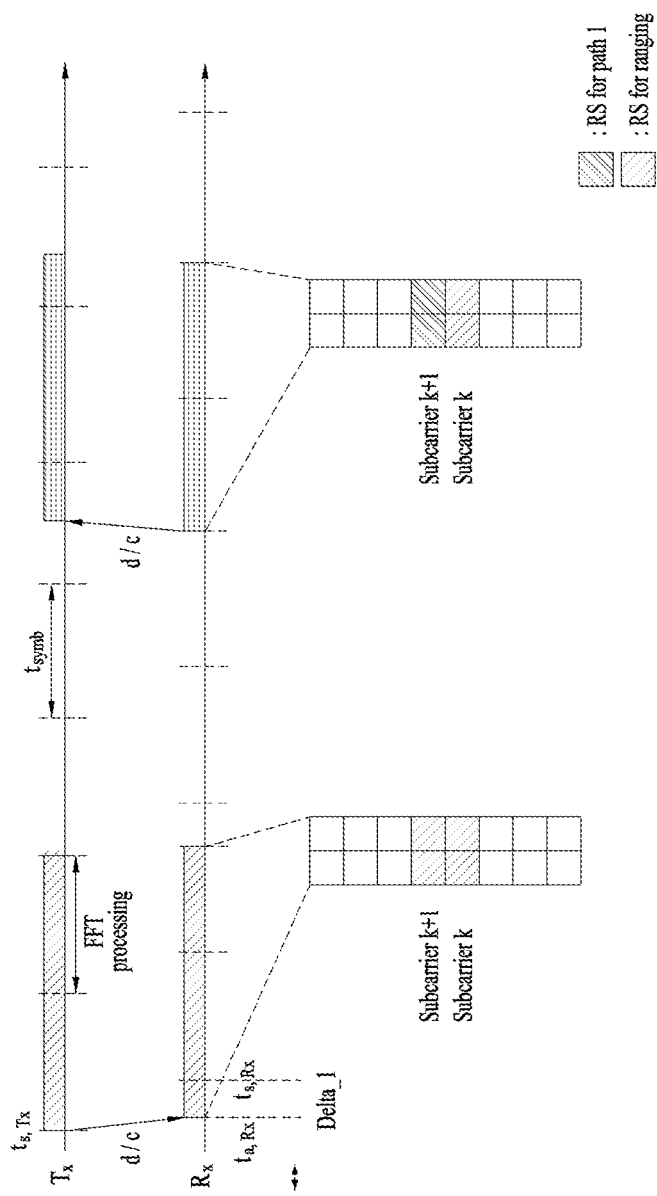
FIG. 17 is a diagram illustrating a method of transmitting RSs based on multiple paths.

As another example, referring to FIG. 17, a phase difference in calculating a distance based on PDOA may be proportional to the distance between the transmitter and the receiver. As an example, when there are multiple paths but there is no interference, a path having the shortest phase difference may have a high probability of approximating to an LOS path. Therefore, the receiver may inform the transmitter of only phase difference information corresponding to a path having the shortest phase difference among paths corresponding to the case in which the strength of a signal (e.g., SNR) is a specific threshold yth or more among signals transmitted through multiple paths. As an example, when the receiver acquires multipath profiles as illustrated in FIG. 11, the receiver may inform the transmitter of phase difference information through RSs as illustrated in FIG. 17. That is, in FIG. 17, an RS for path 1 may be transmitted on subcarrier k+1. Through this, the receiver may inform the transmitter of phase difference information about path 1.

Figure 18:
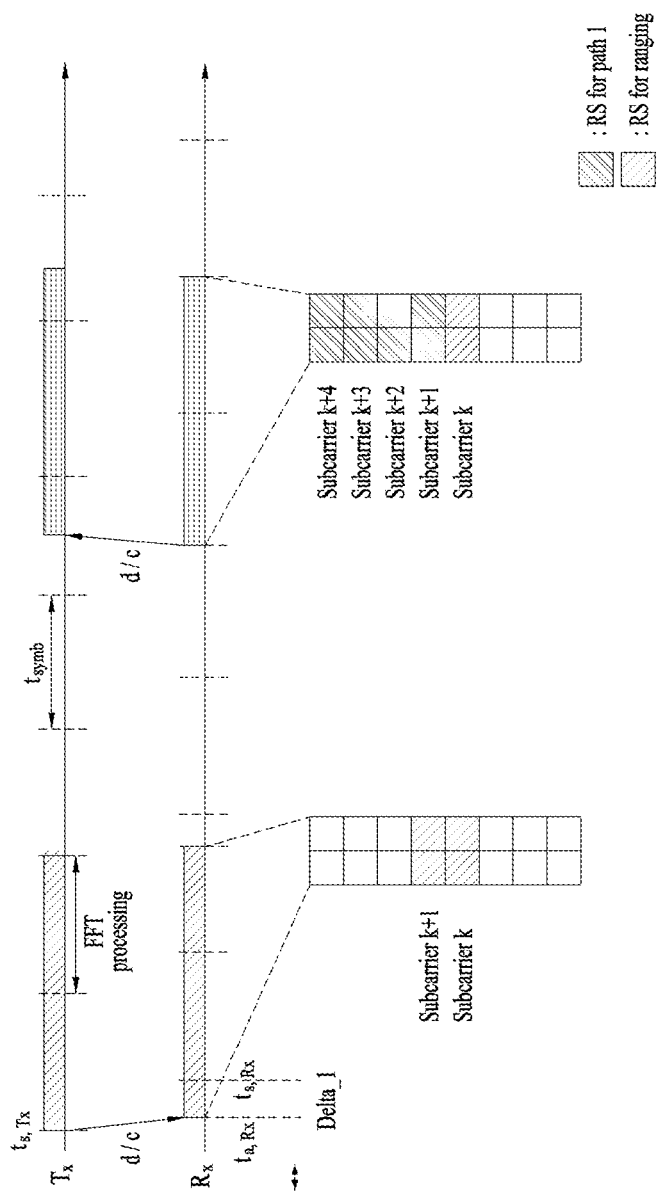
FIG. 18 is a diagram illustrating a method of transmitting RSs based on multiple paths.
Figure 19:
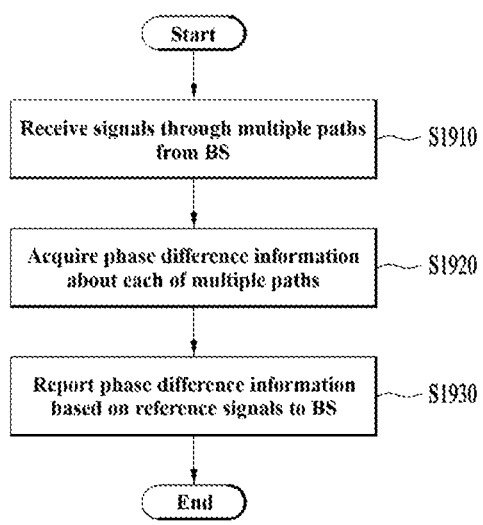
FIG. 19 is a diagram illustrating a method of performing location measurement by a terminal.

As another example, when there are a large number of RSs through which phase difference information is reported to the transmitter, the receiver may inform the transmitter of the phase difference information through a plurality of RSs as illustrated in FIG. 18 and this is not limited to the above-described embodiment.

As another example, the receiver may inform the transmitter of an average of phase differences for all paths through RSs. In this case, the receiver may transmit phase difference information to the transmitter through various methods as described above. In an example, a physical layer or higher layer signal of a network may be preconfigured for the receiver and the receiver may select a specific method through the preconfigured physical layer or higher layer.

Upon transmitting phase difference information through RSs, the receiver may transmit the phase difference information by differently setting power of the RSs. As an example, the receiver may transmit the phase difference information by carrying higher power on a subcarrier having a better SNR among subcarriers for the RSs for transmitting the phase difference information.

In this case, the receiver may explicitly report quality information about a path, such as reference signal received power (RSRP), to the transmitter or the location server, as a measurement value for each path. Then, the transmitter or the location server may confirm uncertainty of each path.

In an example, even the transmitter may separate signals transmitted by the receiver according to respective paths using multiple antennas. Therefore, when there are M paths from the transmitter to the receiver and N paths from the receiver to the transmitter, the transmitter may calculate distances for up to M*N paths. In this case, the distance between the transmitter and the receiver may be calculated using information about paths satisfying the above-described condition. Alternatively, the location of the receiver may be calculated by transmitting information about paths satisfying the above-described condition to the location server.

As another example, an RS for PDOA, a threshold yth, and the number of paths about which the receiver should inform the transmitter of phase difference information may be limited to specific values or may be indicated to the transmitter through a physical layer or higher layer signal of a network. As another example, the receiver may determine information about the characteristic of an ambient channel thereof and this is not limited to the above-described embodiment.

As another example, the number of paths about which the receiver should inform the transmitter of phase difference information may be differently set according to the purpose of using a phase difference by the transmitter. For example, when transmitter estimates only a distance to the receiver, if the receiver transmits phase difference information about multiple paths to the transmitter, it may be difficult for the receiver to determine which phase difference information should be used to measure the distance. Then, it may be difficult to measure the distance between the transmitter and the receiver. Therefore, upon measuring the distance between the transmitter and the receiver, it may be better for the receiver to inform the transmitter of phase difference information only about the shortest path. Herein, when the location of the receiver is measured through multilateration, since much information may cause reduction in error of location tracking, phase difference information about multiple paths need to be transmitted to the receiver. Therefore, whether the purpose of using PDOA is distance tracking between the transmitter and the receiver or location tracking through multilateration may be predetermined or may be signaled by the network and location measurement therethrough may be performed.

In the above description, the transmitter may be a BS and the receiver may be a UE. In an example, the transmitter may be the UE and the receiver may be the BS but the transmitter and the receiver are not limited to the above-described embodiment.

The UE may receive signals through multiple paths from the BS (S1910). As described in FIGS. 1 to 18, the UE may distinguish between the signals received through the multiple paths using spatial filtering or an antenna array. The UE may acquire a phase difference of a signal corresponding to each path. The UE may acquire location information by a PDOA scheme based on a phase difference of a signal and this is as described above. More specifically, the UE may acquire the location information using phase difference information based on a plurality of frequencies input to the receiver through a specific path among the multiple paths and this is as described above.

Next, the UE may acquire phase difference information about each of the multiple paths (S1920). As described in FIGS. 1 to 18, the UE may acquire phase difference information caused by different frequencies with respect to each path. The phase difference information may be used to acquire the location information of the UE and this is as described above. As another example, the UE may report, to the BS, capability information as to whether the UE is capable of distinguishing between signals for the multiple paths and acquiring phase difference information about each of the multiple paths. That is, if it is indicated that the UE is capable of distinguishing between the signals for the multiple paths and acquiring the phase difference information of each of the multiple paths, the UE may transmit the phase difference information of each of the multiple paths to the BS.

Next, the UE may report the phase difference information based on RSs to the BS (S1930). As described in FIGS. 1 to 18, the UE may transmit an RS corresponding to each path to the BS. The RS corresponding to each path may have a phase difference. Then, the BS may acquire phase difference information about the multiple paths through respective RSs and this is not limited to the above-described embodiment.

As another example, the UE may transmit, to the BS, the phase difference information only about a signal having strength of a threshold or more among the signals for the multiple paths. In an example, when the number of the RSs for reporting of the phase difference information is reported is smaller than the number of the signals having strength of the threshold or more, the UE may transmit, to the BS, the phase difference information corresponding to the number of RSs based on an order of signals having a small phase difference. As another example, the UE may transmit, to the BS, only a signal corresponding to a path having the smallest phase difference among signals for the multiple paths.

In an example, when the UE reports information about a distance between the BS and the UE to the BS, the UE may transmit only a signal corresponding to a path having the smallest phase difference to the BS. In this case, when the UE reports location information thereof to the BS, the UE may transmit information about all phase differences for the multiple paths to the BS.

The embodiments of the present disclosure mentioned in the foregoing description can be implemented using various means. For instance, the embodiments of the present disclosure can be implemented using hardware, firmware, software and/or any combinations thereof.

When implemented as hardware, a method according to embodiments of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present disclosure may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present disclosure have been described in detail above to allow those skilled in the art to implement and practice the present disclosure. Although the preferred embodiments of the present disclosure have been described above, those skilled in the art will appreciate that various modifications and variations can be made in the present disclosure without departing from the spirit or scope of the disclosure. For example, those skilled in the art may use a combination of elements set forth in the above-described embodiments. Thus, the present disclosure is not intended to be limited to the embodiments described herein, but is intended to accord with the widest scope corresponding to the principles and novel features disclosed herein. The present disclosure may be carried out in other specific ways than those set forth herein without departing from the spirit and essential characteristics of the present disclosure. Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein. The present disclosure is not intended to be limited to the embodiments described herein, but is intended to accord with the widest scope consistent with the principles and novel features disclosed herein. In addition, claims that are not explicitly cited in each other in the appended claims may be presented in combination as an embodiment of the present disclosure or included as a new claim by subsequent amendment after the application is filed.

In addition, both an apparatus disclosure and a method disclosure are explained in the present specification, and if necessary, the explanation on both the disclosures can be complementally applied.

The invention claimed is:

1. A method of performing location measurement based on phase difference of arrival (PDOA) by a user equipment (UE) in a wireless communication system, the method comprising:
receiving signals through multiple paths from a base station (BS);
acquiring phase difference information about each of the multiple paths; and
reporting, to the BS, at least part of the phase difference information based on reference signals,
wherein the at least part of the phase difference information that is reported to the BS only relates to signals having a strength that is greater than or equal to a threshold, among the signals that are received through the multiple paths, and
wherein, based on a number of the reference signals being fewer than a number of the signals having the strength that is greater than or equal to the threshold, the at least part of the phase difference information related to the number of the reference signals is reported to the BS in an order of signals having a smaller phase difference.

2. The method of claim 1, wherein the UE reports, to the BS, capability information as to whether the UE is capable of distinguishing between signals for the multiple paths and acquiring the phase difference information about each of the multiple paths.

3. The method of claim 1, wherein only a signal related with a path having a smallest phase difference among signals for the multiple paths is transmitted to the BS.

4. The method of claim 3, wherein the UE transmits only the signal related with the path having the smallest phase difference to the BS, based on reporting of information about a distance between the UE and the BS to the BS.

5. The method of claim 4, wherein the UE transmits information about all phase differences of the signals for the multiple paths to the BS, based on reporting of information about a location of the UE to the BS.

6. The method of claim 5, wherein whether the UE is to report the information about the distance or the information about the location to the BS is set based on a higher layer signal.

7. The method of claim 1, wherein the reporting of the phase difference information based on the reference signals to the BS is set based on a higher layer signal.

8. A user equipment (UE) configured to perform location measurement based on phase difference of arrival (PDOA) in a wireless communication system, the UE comprising:
a receiver configured to receive a signal;
a transmitter configured to transmit a signal; and
a processor configured to control the receiver and the transmitter,
wherein the processor is further configured to:
receive, through the receiver, signals through multiple paths from a base station (BS),
acquire phase difference information about each of the multiple paths, and report, to the BS through the transmitter, at least part of the phase difference information based on reference signals, wherein the at least part of the phase difference information that is reported to the BS only relates to signals having a strength that is greater than or equal to a threshold, among the signals that are received through the multiple paths, and wherein, based on a number of the reference signals being fewer than a number of the signals having the strength that is greater than or equal to the threshold, the at least part of the phase difference information related to the number of the reference signals is reported to the BS in an order of signals having a smaller phase difference.

9. The UE of claim 8, wherein the processor reports, to the BS, capability information as to whether the UE is capable of distinguishing between signals for the multiple paths and acquiring the phase difference information about each of the multiple paths.

10. The UE of claim 8, wherein only a signal related with a path having a smallest phase difference among signals for the multiple paths is transmitted to the BS.

11. The UE of claim 10, wherein the processor transmits only the signal related with the path having the smallest phase difference to the BS, based on reporting of information about a distance between the UE and the BS to the BS.

12. The UE of claim 8, wherein the UE is capable of communicating with at least one of another UE, a UE related to an autonomous driving vehicle, a base station or a network.

* * * * *